July 8, 1952 — S. WANAMAKER — 2,602,356
STRAINER ASSEMBLING DEVICE
Filed Nov. 12, 1949
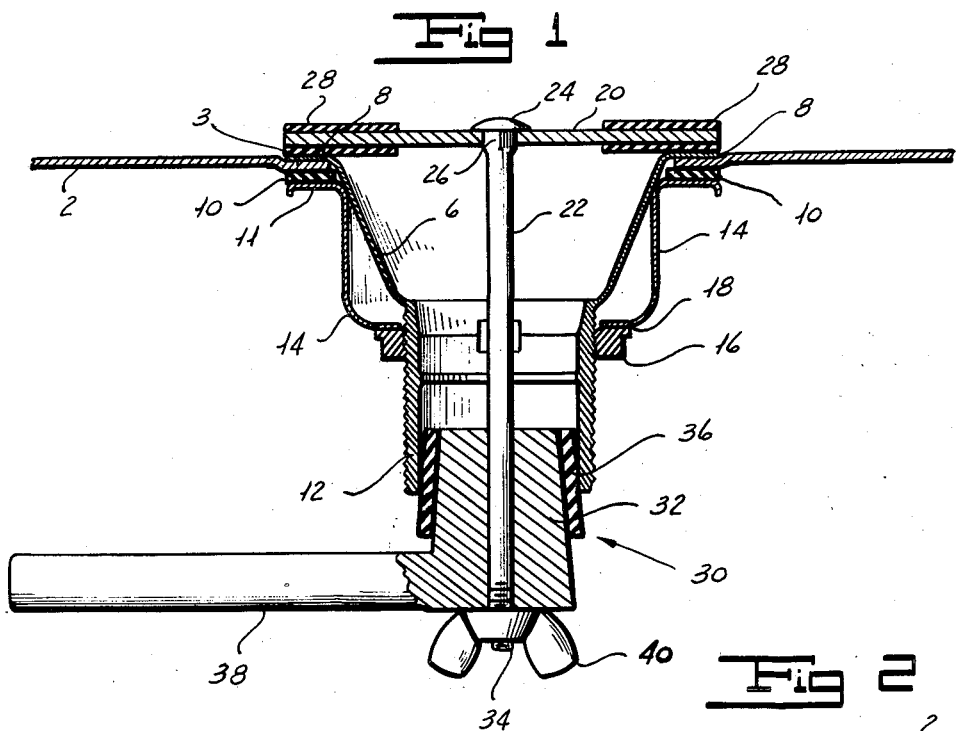
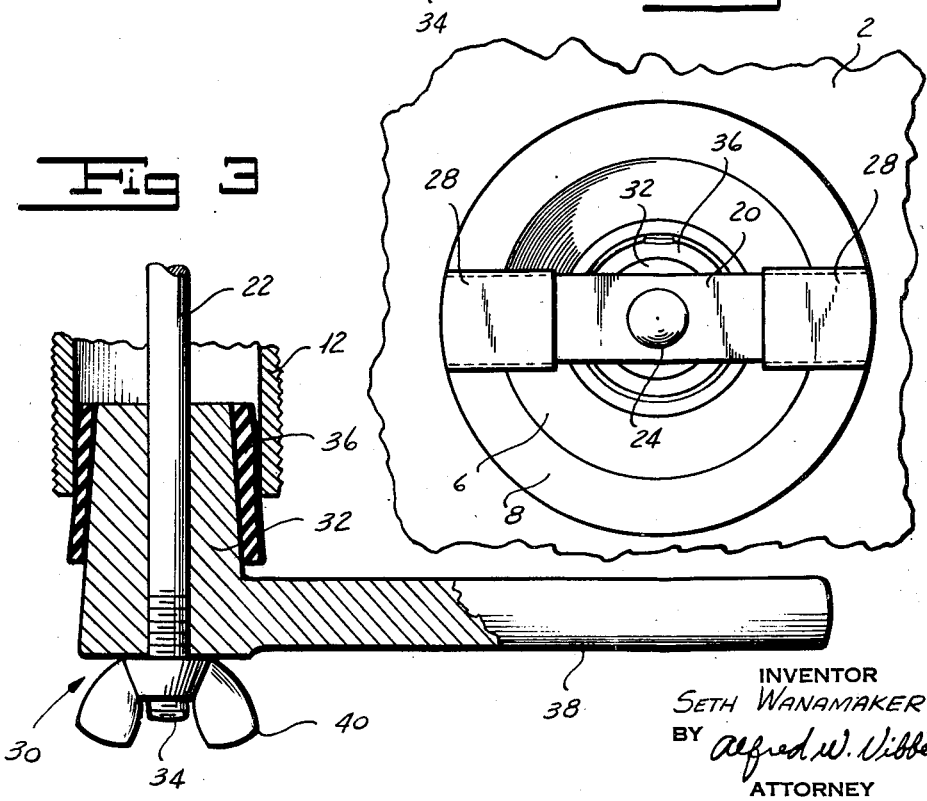
INVENTOR
SETH WANAMAKER
BY Alfred W. Vibber
ATTORNEY Patented July 8, 1952

2,602,356

UNITED STATES PATENT OFFICE 2,602,356

STRAINER ASSEMBLING DEVICE

Seth Wanamaker, Ramsey, N. J.

Application November 12, 1949, Serial No. 126,804

4 Claims. (Cl. 81—3)

This invention relates to a tool or device for assembling or disassembling a fitting such as the strainer in a sink.

The conventional sink strainer or outlet fitting now employed in homes consists of a bell-shaped member made of sheet metal, such member having an outwardly projecting flange which fits downwardly within a shallow well at the outlet hole in the sink. Connection of the sink strainer to the sink, and its sealing thereto, are made by means of a somewhat similar bell-shaped article, designated a coupling, which fits over the threaded tail-piece on the sink strainer and into contact with a gasket interposed between it and the bottom surface of the sink. The coupling is held in such sealing position by means of a lock-nut threaded upwardly upon the threaded tail-piece of the strainer, there being packing interposed between the nut and coupling, such nut thrusting the upper surface of the coupling tightly into contact with the gasket.

The conventional sink strainer is made smooth in external contour, and also presents very little by way of irregular surface interiorly thereof whereby the strainer may be grasped as by a wrench or similar tool or even by one's hand to prevent it from rotation when it is assembled in the sink or disassembled therefrom. Consequently, even when two plumbers are available, the assembly and disassembly of the sink strainer with respect to the sink is a difficult operation, the disassembly, particularly after the parts have been corroded through long use, being exceedingly difficult. Furthermore, because of the width of the sink, it is very difficult if not impossible for one plumber, in installing such strainer or in removing it from the sink, to hold the strainer from rotation while he is manipulating the strainer holding nut from beneath the sink. Where it has been attempted to hold the strainer by engagement with the threaded tail-piece by a tool such as a wrench, the inevitable result is the scarring and deformation of the threads on the tail-piece such that further operation of the lock-nut therealong becomes difficult, if not impossible.

It is accordingly among the objects of the present invention to provide a simple, light, easily carried and easily applied strainer assembling device for use in the described assembling and disassembling operations.

A further object of the invention resides in the provision of a device of the type described which allows such assembly and disassembly of the strainer with respect to the sink by one plumber working below the sink, such device minimizing the possibility of scarring of the sink and of the deformation or other injury of the sink strainer and the threaded tail piece thereof.

These and further objects of the invention will be more readily apparent in the following description of a preferred embodiment of the strainer assembly device of the invention.

In the drawing accompanying the specification and forming a part thereof:

Fig. 1 is a view in vertical cross-section through a sink having a sink strainer applied thereto the strainer assembling and disassembling device of the invention being shown mounted on such strainer;

Fig. 2 is a fragmentary view in plan of the sink with the sink strainer assembled therein and with the strainer assembling device of the invention mounted thereon; and Fig. 3 is a fragmentary view, partially in vertical section and partially in side elevation, of the assembling device in the vicinity of the lower, tail-piece holding, means thereof.

In the drawings the portion of the sink in the vicinity of the discharge opening therethrough is shown in Figs. 1 and 2, wherein the sink is designated by the reference character 2. Surrounding such discharge opening in the sink is a shallow depressed portion or well 3 of annular shape. Fitting within such well 3 is the top horizontal flange 8 of the sink strainer, such strainer being generally designated by the character 6. The depth of well 3 is such that the top surface of the flange 8 of the strainer lies substantially in the plane of the inner bottom surface of the sink. Sealing of the strainer 6 to the sink is effected by means of the gasket 10 disposed beneath the bottom surface of the well 3 and surrounding the intermediate portion of the strainer 6, as shown in Fig. 1. A bell-shaped coupling 14, similar in shape to the midsection of strainer 6, is disposed outwardly thereof, as shown. Coupling 14 has an upper horizontal flange portion 11 which contacts the underside of the gasket 10 when the coupling is pressed upwardly thereagainst.

Connection of the bottom of the sink strainer 6 to the outlet trap (not shown) is effected through the medium of the threaded tail piece 12 of the sink strainer. Such threaded tail piece also functions to carry the lock-nut 16 which holds coupling 14 tightly in engagement with gasket 10, as shown in Fig. 1. Sealing of the unit is completed by means of the packing material 18 which is interposed between the upper surface of nut 16 and the lower end of coupling 14.

It will be appreciated that when the sink strainer assembly is being connected to or disconnected from the sink by the turning of nut 16, the only force applied to the strainer 6 by the sink to restrain the strainer from rotation arises from the frictional engagement between the bottom surface of its flange 8 and the upper surface of the well 3 of the sink. Since these parts, respectively, are made of metal and porcelain coated metal, it will be appreciated that such frictional restraint is relatively small and that it is usually exceeded by the friction set up between the upper surface of the nut 16 and the packing material 18. It is therefore quite difficult, in the absence of means such as provided by the device of the invention, to prevent strainer 6 from turning while nut 16 is being tightened or loosened in the assembling and disassembling operations, respectively. Thus it is quite difficult to effect an adequate seal in assembling operation between the sink and the coupling 14, and between the coupling and the nut 16. It is even more difficult to disassemble the strainer, as above pointed out, after it has been in use for some time, due to corrosion of the threaded tail piece 12 and of the nut 16. Such condition still further increases the tendency of the strainer 6 to turn with respect to the sink.

The strainer assembly device of the present invention consists of means frictionally to engage the upper flange portion of the strainer, means frictionally to engage the inner bottom surface of the threaded tail-piece thereof, means to connect such two frictional engaging means together, and means, such as a handle, whereby the assembly device and thus the strainer may be restrained from turning while the lock-nut is being turned upon the threaded tail-piece. In the preferred embodiment here illustrated the first means takes the form of a cross arm 20 which diametrically spans the upper end of the sink strainer at the flange thereof. Arm 20 is provided centrally thereof with a squared or otherwise keyed opening through which extends the upper end of the elongated bolt 22. Bolt 22 is provided with an enlarged head 24, the portion of the shank of the bolt beneath such head being of a shape, square in this embodiment, complementary to the shape of the hole in arm 20, whereby the bolt is restrained from rotation with respect to the arm. The outer ends of arm 20 are provided with resilient gripping means such as the pads 28 which are telescoped over such ends, in this embodiment pads 28 being made of rubber or rubber-like materials which thus provide a high coefficient of friction between them and the upper surface of flange 8.

Bolt 22 is of such length as to extend downwardly through and to protrude from the lower end of the threaded tail-piece 12, as shown in Figs. 1 and 3. Such lower end of bolt 22, which is threaded at 34, cooperates with a lower tail-piece engaging and holding means generally designated by the character 30. Means 30 is composed of a main body portion 32 in the form of a frustum of a cone, the cone having its apex lying above body 32. Positioned on the upper, smaller, end of body 32 is a sleeve 36 of material having a large coefficient of friction with the internal surface of the threaded tail-piece. Preferably sleeve 36 is formed as a conventional piece of hose which is driven upon member 32 in the telescoped relation shown. Body 32 is provided, below the lower end of sleeve 36, with a radially directed arm 38 of appreciable length by which the assembly device may be gripped to restrain it from rotation. Body 32 and arm 20 are pulled toward each other so that pads 28 and sleeve 36 forcibly engage the upper surface of flange 8 and the internal surface of tail-piece 12, respectively, in the preferred embodiment a wing nut 40 threaded upon end 34 of bolt 32 being employed to accomplish such tightening of the gripping means toward each other.

It is believed that, from the above, the manner of mounting of the assembling device on the strainer, and the manner of its use will be apparent.

Briefly, in assembling a strainer in a sink the parts of the strainer, that is the part 6, the coupling 14, the packing 18, and the nut 16, will be assembled as shown in Fig. 1. After nut 16 has been threaded upwardly to some extent the assembly device of the invention is then applied to the strainer. This is done with the wing nut 40 and the body 32 removed from the lower end of bolt 22, such bolt 22 being inserted downwardly within the tail-piece so that the pads 28 on arm 20 lie in contact with flange 8. Thereupon body 32 is telescoped over the lower end of bolt 22 and the wing nut 40 is applied to threaded end 34 and is screwed upwardly so as tightly to engage means 28 and 36 with the described parts of the sink strainer. The strainer can then be tightened in sealed relationship by a plumber, such plumber holding the arm 38 with one hand and operating upon nut 16 with a wrench held in his other hand. After such assembly operation is completed, the assembling tool or device of the invention is removed from the sink strainer by the reverse operations, that is, by removing wing nut 40 and body 32, after which bolt 22 and arm 20 may be lifted from the strainer. It is obvious that the same operations of mounting of the assembling and disassembling device of the invention in the strainer will be carried out when it is desired to hold the strainer while the latter is being disassembled from the sink.

The assembling device of the invention is simple, light in construction and is cheaply made. The arm 20 may be made from bar stock. The bolt 22 may be a conventional long carriage bolt, and the body 32 may be made of cast steel or iron. When the tool is not in use it may be disassembled to occupy a minimum of space by removing the bolt 22 from the arm 20. Thus the device may conveniently be packed and carried to and from the job in a small container such as an elongated box rectangular in plan.

Whereas for purposes of illustration I have described and shown a preferred embodiment of the strainer assembly device of my invention, it will be obvious that such device is capable of considerable variation as to detail within the scope of the invention. The invention is, therefore, defined by the claims appended hereto.

I claim as new the following:

1. An assembling and disassembling device for a sink strainer having an upper, sink-engaging, horizontal flange thereabout, and a vertical, lower, tail pipe coaxial with the body of the strainer, comprising an elongated member adapted to be inserted vertically through the strainer coaxially thereof, a cross-arm adapted to be mounted on the strainer with the ends thereof resting upon the upper surface of the flange of the strainer at points diametrically opposite thereof, means connecting the elongated member to the cross-arm, means adapted to be telescoped over the lower end of the elongated member frictionally to engage the inner surface at the lower end of the tail pipe, said last named means comprising an at least partially conical member the smaller end of which may be inserted into the tail pipe, said conical member having a passage therethrough axially thereof receiving the lower end of the elongated member, a sleeve of material of high coefficient of friction telescoped over the smaller end of the conical member, a handle on the conical member projecting generally radially thereof, and lower end of the elongated member being threaded, and means to advance the first strainer engaging means relatively toward the second such means whereby firmly to hold the strainer therebetween.

2. An assembling and disassembling device for a sink strainer having an upper, sink-engaging, horizontal flange thereabout, and a vertical, lower, tail pipe coaxial with the body of the strainer, comprising an elongated member adapted to be inserted vertically through the strainer coaxially thereof, a cross-arm adapted to be mounted on the strainer with the ends thereof resting upon the upper surface of the flange of the strainer at points diametrically opposite thereof, means connecting the elongated member to the cross-arm, resilient pad members having a high coefficient of friction on the flange engaging ends of the cross-arm, means adapted to be telescoped over the lower end of the elongated member frictionally to engage the inner surface at the lower end of the tail pipe, said last named means comprising an at least partially conical member of strong, hard, material, the smaller end of which may be inserted into the tail pipe, said conical member having a passage therethrough receiving the lower end of the elongated member, a resilient sleeve of material of high coefficient of friction telescoped over the smaller end of the conical member, a handle on the conical member projecting generally radially thereof, and means to advance the first strainer engaging means relatively toward the second such means whereby firmly to hold the strainer therebetween.

3. An assembling and disassembling device for a sink strainer having an upper, sink-engaging, horizontal flange thereabout, and a vertical, lower, tail pipe coaxial with the body of the strainer, comprising an elongated member adapted to be inserted vertically through the strainer coaxially thereof, an upper strainer flange engaging member adapted to be mounted on the strainer with the radially outer portion thereof resting upon the upper surface of the flange of the strainer at points spaced angularly about the strainer axis, means connecting the elongated member to the strainer flange engaging member, means adapted to be telescoped over the lower end of the elongated member frictionally to engage the inner surface at the lower end of the tail pipe, said last named means comprising an at least partially conical member the smaller end of which may be inserted into the tail pipe, said conical member having a passage therethrough axially thereof receiving the lower end of the elongated member, means on the lower end of the conical member whereby it may be held to prevent turning of such member and of the upper strainer flange engaging member when the device is in operative, sink strainer engaging, position, the lower end of the elongated member being threaded, and means to advance the strainer flange engaging means relatively toward the tail pipe engaging means whereby firmly to hold the strainer therebetween.

4. An assembling and disassembling device for a sink strainer having an upper, sink-engaging, horizontal flange thereabout, and a vertical, lower, tail pipe coaxial with the body of the strainer, comprising an elongated member adapted to be inserted vertically through the strainer coaxially thereof, an upper strainer flange engaging member adapted to be mounted on the strainer with the radially outer potrion thereof resting upon the upper surface of the flange of the strainer at points spaced angularly about the strainer axis, means connecting the elongated member to the strainer engaging member, means adapted to be telescoped over the lower end of the elongated member frictionally to engage the inner surface at the lower end of the tail pipe, said last named means comprising an at least partially conical member the smaller end of which may be inserted into the tail pipe, said conical member having a passage therethrough axially thereof receiving the lower end of the elongated member, a handle on the lower, larger diametered, end of the conical member and projecting generally radially thereof, the lower end of the elongated member being threaded, and means to advance the strainer flange engaging means relatively toward the tail pipe engaging means whereby firmly to hold the strainer therebetween.

SETH WANAMAKER.

REFERENCES CITED

The following references are of record in the file of this patent:

UNITED STATES PATENTS

| Number | Name | Date |
| --- | --- | --- |
| 527,200 | Hall | Oct. 9, 1894 |
| 827,254 | Mills | July 31, 1906 |
| 1,880,615 | White et al. | Oct. 4, 1932 |
| 2,070,579 | Brooke | Feb. 16, 1937 |
| 2,093,219 | Tolland | Sept. 14, 1937 |